United States Patent Office 3,074,233
Patented Jan. 22, 1963

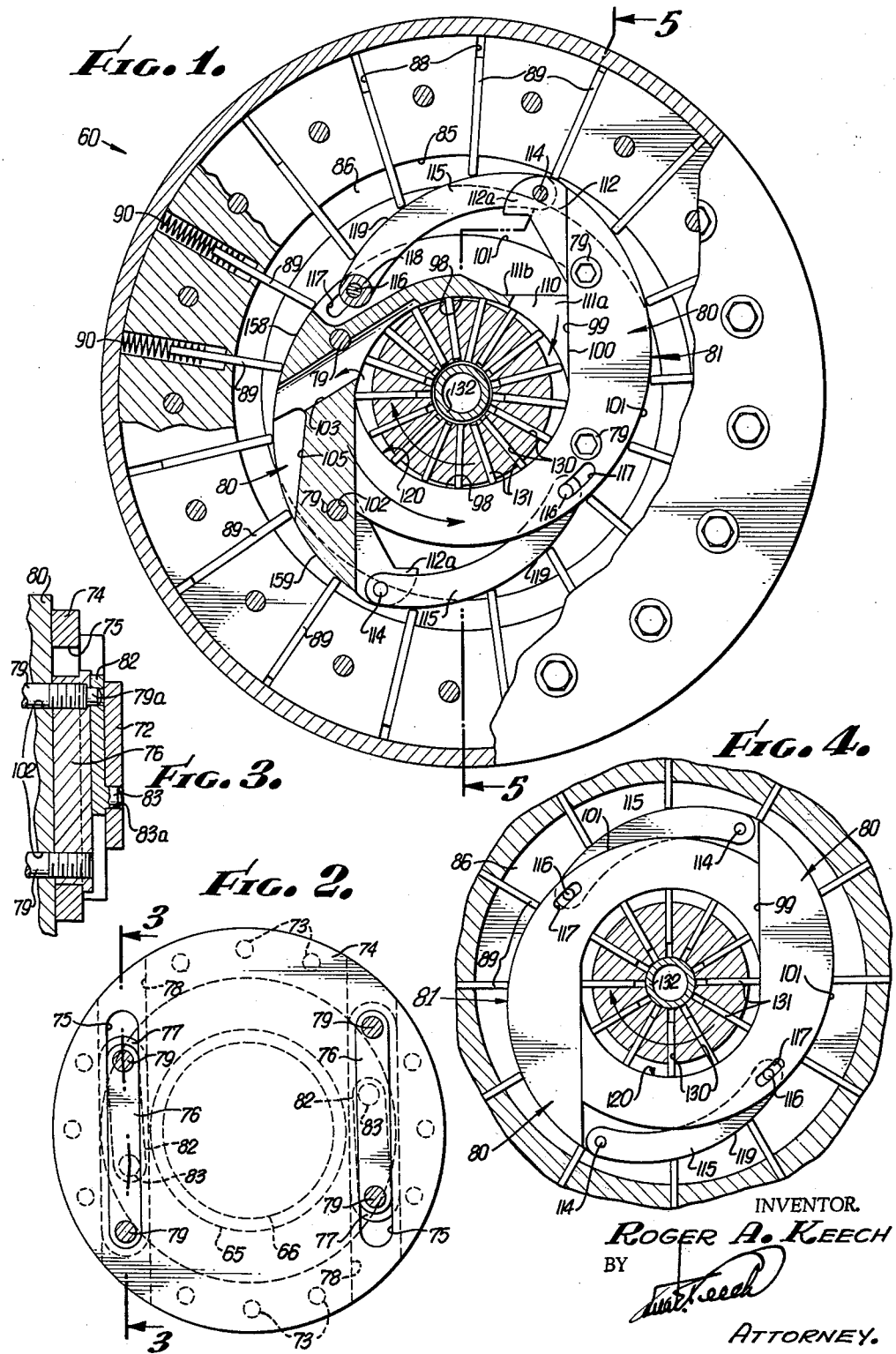

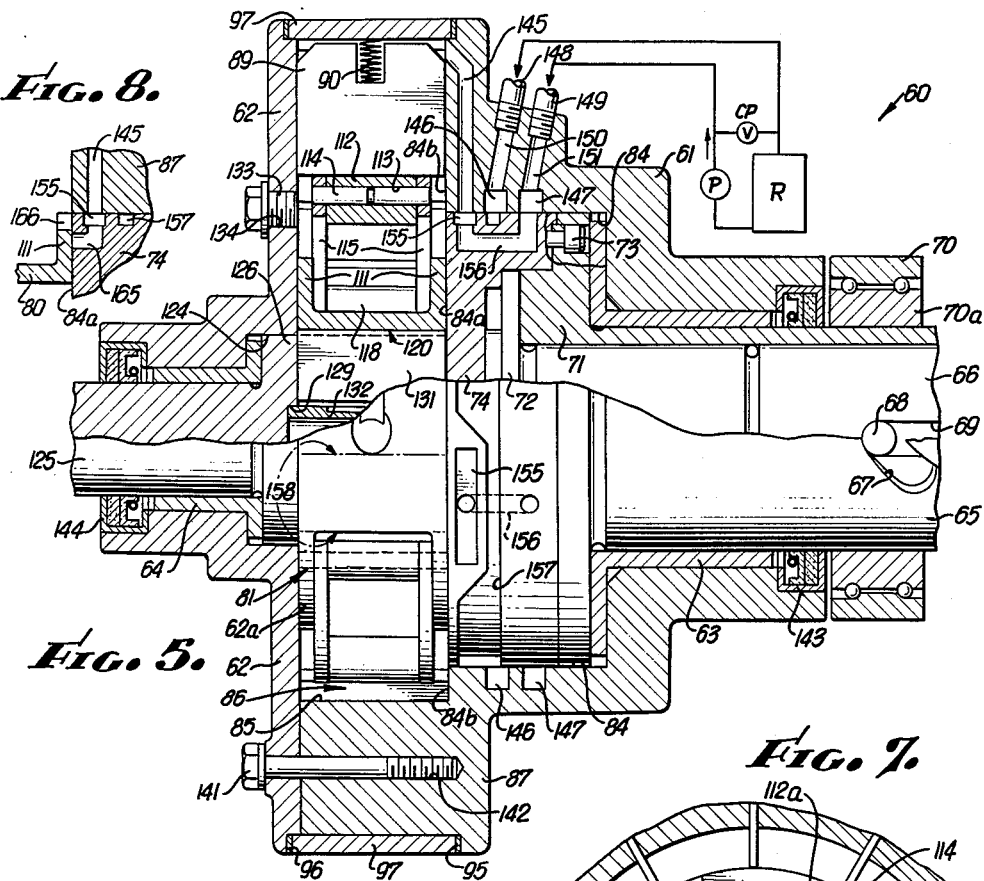

3,074,233
POSITIVE DISPLACEMENT VARIABLE SPEED HYDRAULIC POWER TRANSMISSION WITH REVERSE
Roger A. Keech, Covina, Calif., assignor of twenty-five percent to Dana E. Keech, Los Angeles, Calif.
Filed Sept. 12, 1961, Ser. No. 138,229
12 Claims. (Cl. 60—53)

This invention relates to positive displacement variable speed hydraulic power transmissions and is an improvement on the transmission disclosed in my copending application for U.S. patent, Serial No. 27,322, filed May 6, 1960, now U.S. Patent No. 3,027,719.

A unique feature of the last mentioned transmission is the concentric and coplanar juxtaposition of a hydraulic vane pump and a hydraulic vane motor so that the stator of the pump comprises the rotor of the motor. The stationary housing enclosing the motor rotor has an endless series of vanes inwardly biased against the motor rotor. Radial passages in the motor rotor connect the pump chamber with the motor chamber so that the motor rotor is rotated by liquid drawn from the motor chamber at two diametrically opposed points by the pump and discharged by the pump into the motor chamber at two different diametrically opposed points. This action results from the motor rotor providing an ellipsoidal balanced internal chamber in which the pump vanes function, and an ellipsoidal balanced external chamber formed between the periphery of the motor rotor and the housing. The ellipsoidal character of the external chamber is produced by the ellipsoidal outline of the periphery of the motor rotor against which the motor vanes function.

A drive shaft carries the pump rotor and a driven shaft carries the motor rotor. The drive ratio between the drive and driven shafts is determined by the relation between the amount of liquid positively displaced by the pump and the amount of liquid positively displaced by the motor. Provision is made in said transmission for varying this drive ratio by altering simultaneously and conversely the configurations of the internal chamber and external peripheral surface of the motor rotor. These changes start with the pump chamber circular and with the external periphery of the motor rotor having a maximum elongation. At the other extremity of the changes, the internal pump chamber assumes a maximum degree of ellipsoidal elongation in outline and the outline of the periphery of the motor rotor becomes circular.

At the start of the motor rotor changes above noted, the drive ratio is infinity to zero. At the conclusion of the changes above noted, the drive ratio is one to one.

Provision is also made in said transmission for mechanically accomplishing the changes aforesaid in the internal and external outlines of the motor rotor by a control mechanism which is manipulatable from outside the housing.

Dependence is placed however on the motor vanes maintaining a close sliding contact with the peripheral surface of the motor rotor after the latter has become circular in outline in order to maintain a one to one drive ratio in the transmission. To attain such a tight sliding fit, the vanes must be pressed inwardly against the motor rotor with a degree of pressure which sets up a certain amount of friction throughout the maintenance of the one to one drive ratio. As this ratio is the most commonly used in the operation of the transmission, it is highly desirable to reduce the friction developed in the transmission at this time.

It is accordingly an object of the present invention to produce a transmission of the type above described, in which provision is made for minimizing the amount of friction produced incidental to the operation of the transmission in a one to one drive ratio.

Another object of the invention is to provide a transmission of the type aforementioned wherein means is provided for very substantially reducing the friction between the motor rotor and the motor vanes engaging the periphery thereof without impairing the sealing action of said vanes, while said motor rotor is adjusted to produce a lower drive ratio than one to one.

In the aforesaid transmission, no provision was made for accomplishing a reverse rotation of the driven shaft. In certain uses of a transmission, such as in automotive vehicles, a reverse drive, at least at a fairly low speed, is almost a necessity.

A further object of the invention, therefore, is to provide such a transmission which incorporates a reverse drive mechanism.

Yet another object is to provide such a transmission with a reverse mechanism which is available only at the extreme lower end of the range of drive ratios which can be set up in the transmission.

The manner of accomplishing the foregoing objects as well as further objects and advantages will be made manifest in the following description taken in connection with the accompanying drawings in which FIG. 1 is a face view of a preferred embodiment of the invention with portions of the structure broken away to different levels to illustrate details of said structure. The motor rotor is shown adjusted in this view so as to produce a reverse rotation of the driven shaft of the invention.

FIG. 2 is an elevational view of the mounting plate of the motor rotor of the invention.

FIG. 3 is a fragmentary sectional view taken on line 3—3 of FIG. 2 and shows details of the linkage for controlling contour changes of the motor rotor.

FIG. 4 is a diagrammatic fragmentary sectional view illustrating the motor rotor of the invention adjusted so that the contour of the chamber formed internally therein is circular, whereby a drive ratio of infinity to zero is effected by the transmission.

FIG. 5 is a vertical longitudinal sectional view of the invention taken on line 5—5 of FIG. 1 and includes diagrammatic representation of auxiliary means optionally employed for providing a reserve supply of operating liquid under adjustable pressure.

FIG. 6 is a view similar to FIG. 4 and illustrates the operation of the invention with the motor rotor adjusted to provide a positive elongation of the contour of the pump chamber provided internally therein while the peripheral contour of the motor rotor is also ellipsoidal in character whereby varying drive ratios between infinity to zero and one to one may be accomplished by variations in adjustment of the motor rotor while the general conditions shown in this view prevail.

FIG. 7 is a view similar to FIG. 6 and illustrates the operation of the invention when the motor rotor has been adjusted to give the pump chamber, provided internally therein, a contour of maximum elongation while the contour of the periphery of the motor rotor has been converted into a circle, whereby a one-to-one drive ratio is accomplished in the transmission. This view also shows how, at the extreme of adjustment illustrated in this view the flow of operating liquid from the pump of the transmission to the motor thereof is automatically cut off so as to no longer require frictional engagement of the motor vanes with the periphery of the motor rotor in order to maintain the one-to-one drive relation.

FIG. 8 is a fragmentary detail sectional view illustrating a modified means for delivering operating liquid under pressure behind the motor vanes for selectively pressing these against the motor rotor only in those areas where such pressure is required for proper operation of the transmission. This modification dispenses with the need for auxiliary means for providing operating liquid under pressure for this purpose.

Referring specifically to the drawings, the invention is there shown as preferably embodied in a transmission 60 including a case 61 having a cover 62, the case having a bearing 63 and the cover having a bearing 64, said bearings being coaxial.

Journaling in bearing 63 is a hollow driven shaft 65 inside which a control shaft 66 is rotatably confined. The hollow shaft 65 has an oblique spirally related slot 67 formed therein for receiving a pin 68, which also passes through a longitudinal straight slot 69 formed in the control shaft 66. A ball bearing collar 70 surrounds the driven shaft 65 and the inner race 70a thereof connects with pin 68 and provides a means of shifting this pin longitudinally to cause a slight degree of relative rotation between the driven shaft 65 and the control shaft 66 to control the drive ratio produced in the operation of the transmission 60.

The inner end of hollow shaft 65 has an external flange 71 which abuts against an external flange 72 on the inner end of the control shaft 66. Secured by bolts 73 to the peripheral portion of the flange 71 is a driven rotor assembly plate 74. This plate has a pair of parallel slots 75 which extend entirely through this plate in which slots are mounted control slides 76 which are substantially shorter than said slots, and have shoulders 77 which overlap shoulders provided by recesses 78 formed in outwardly disposed portions of said slots.

Secured rigidly to inner faces of slides 76 by Allen screws 79 are two like J elements 80 of an adjustable pump-driven motor rotor 81. Pivoted on a pin end 79a provided on one of the screws 79 of each of the elements 80 is a short link 82 having a pin 83, formed integral therewith which extends from the opposite end of said link into a suitable hole 83a provided to receive the same in the flange 72 on the inner end of control shaft 66. Thus it will be noted that rotation of the control shaft 66 relative to the hollow driven shaft 65 by axial movement of the ball bearing collar 70 will cause an opposite shifting of the slides 76 in the slots 75 and a corresponding shifting of the J elements 80 of the driven rotor relative to each other.

The driven motor rotor elements 80 are thus adapted to be shifted between the relative positions in which they are shown in FIG. 1 and the relative positions in which they are shown in FIG. 7 in accomplishing changes in the drive ratio effected by the transmission 60.

The case 61 has a counterbore 84 in which the flange 71 and plate 74 are rotatably received so that the inner face 84a of said plate is radially flush with the radial face 84b provided by a second counterbore 85 which provides a cylindrical operating chamber 86 for the operation of the driven rotor 81 and the elements 80 of that rotor makes a close sliding fit with the radial faces 84a and 84b of said chamber provided on one side by the counterbore 85 and assembly plate 74 and, on the other side, with radial face 62a provided by the cover 62.

The counterbore 85 in the case 61 leaves a heavy peripheral stator block 87 surrounding said counterbore, this block being provided with a series of uniformly spaced radial slots 88 for receiving stator vanes 89. The outer end of each of the slots 88 is bored to receive a light expansion spring 90 which fits into a notch in the vane 89 mounted in said slot so as to constantly and lightly bias that vane radially inwardly.

The case 61 has an annular peripheral recess 95 and the cover 62 has a corresponding recess 96, and a cylindrical ring 97 fits into these recesses and surrounds the stator block 87 of the case 61 so as to make a sealing fit with the recesses 95 and 96 while holding the vanes 89 and springs 90 in assembled relation as above described.

Each of the J elements 80 of the pump driven rotor 81 has a concave surface 98 which comprises a sector of a cylinder slightly less than a semi-cylinder, parallel flat surfaces 99 and 100, and a convex semi-cylindrical external surface 101. Each of the J elements 80 also has holes 102 which receive the aforementioned Allen screws 79, and it also has a hole 103 of somewhat larger diameter which is bored inwardly from the surface 101 into approximately tangential penetrating relation with the concave surface 98 to provide a liquid intake passage. An extension 105 of passage 103 is formed by routing material from said element in a direction approximately tangential with the external semi-cylindrical surface 101. A liquid discharge passage 110 is also formed by routing away the material of the element, this passage extending upwardly from the surface 98 alongside the surface 100 and connecting with and extending a substantial distance along the external semi-cylindrical surface 101. A pair of walls 111 are thus provided on each J element on opposite sides of the passage 110.

Opposite inner portions of the passages 110, the walls 111 are thickened to provide shoulders 111a which present flat parallel surfaces to each other on opposite sides of the passage 110 in which they are formed. The horizontal edges 111b of the shoulders 111a also overlap inner edges of liquid discharge passages 110.

Formed integrally with each of the J sections 80 to extend from the flat surface 99 thereof near the juncture of that surface with surface 101, is a link mounting lug 112 having a valve forming nose 112a the inner surface of which is horizontal. Lug 112 also has an axial bore 113 for receiving a pin 114. This pin extends from opposite sides of lug 112 and has mounted thereon adjacent ends of a pair of externally convex arcuate links 115. These links lie in planes just within walls 111 and the other ends of said links are connected by a pin 116 which extends outwardly from said links into slots 117 formed in walls 111. Pin 116 also passes through a tubular sleeve 118 which lies between and spaces links 115.

Link mounting lug 112 has parallel side faces and is disposed directly opposite the adjacent discharge passage 110 so as to make a close sliding fit with the parallel inner faces of shoulders 111a during relative sliding movement between the elements 80.

The links 115 have rounded ends and outer arcuate surfaces 119 which have the same radius as the surfaces 101 on elements 80 and these links are so mounted on these elements that when the latter are in their extreme contracted relation as shown in FIG. 7, the surfaces 119 coincide with the surfaces 101 to form a single cylindrical surface concentric with the driven shaft 65 of the invention. It is to be noted in FIG. 1 as well as in FIGS. 4 and 6, that in the relationships there shown between the elements 80, portions of the external arcuate surfaces 101 of these elements unite with the external arcuate surfaces 119 of the links 115 to give the motor rotor 81 an ellipsoidal external configuration.

With the elements 80 related as shown in FIG. 1, the slightly less than semi-cylindrical concave surfaces 98 of the two elements unite to form a pump rotor chamber 120 which, in this view, is ellipsoidally elongated in a direction which is normal to the direction in which the elements 80 are slidably related. As will be made clear later, the external and internal configurations of the motor rotor 81 are subject to being conversely modified by slidably adjusting the elements 80 relative to each other.

The axial thickness of stator block 87 determines the axial parallel spacing of radial surfaces 84a and 84b, on the one hand, and the radial inner face 62a of cover 62 on the other hand. These radial surfaces form the ends of cylindrical operating chamber 86 of the transmission 60. A cylindrical recess 124 is formed concentric with bearing 64 in the inner face 62a of the cover 62.

Journaling in bearing 64 is a drive shaft 125 having a cylindrical pump drive rotor 126 mounted on its inner end, said rotor having an external diameter permitting it to freely rotate within recess 124 and pump chamber 120. The rotor 126 also has a bore 129 and is provided with an odd numbered series of equally spaced radial vane slots 130 in which a like number of vanes 131 are slidably mounted.

Fitting into bore 129 is a tubular sleeve 132 which acts as a retainer for retaining the vanes 131 outwardly in their respective slots 130. The latter slots are coextensive in axial dimension with the motor rotor 81 and the vanes 131 are also coextensive with said rotor and are centrifugally maintained in slidable relation with the chamber 120 by rotation of the drive shaft 125.

The cover 62 is provided with a filling plug 133 which is screwed into a suitable threaded aperture 134 provided in said cover and which is removed therefrom in order to fill all the open space within the operating chamber 86 with a body of operating liquid which is preferably a heavy lubricating oil.

Suitable gaskets are interposed between opposite edges of ring 97 and recesses 95 and 96 when the cover 62 is assembled on case 61, and the cover is secured to said case by a series of cap screws 141 which screw into threaded holes 142 provided in the stator 87 of the case 61.

Provided in the case 61 at the outer end of bearing 63 is a suitable oil seal 143 while a similar seal 144 is provided in the cover 62 at the outer end of bearing 64.

Formed radially in the motor stator 87 so as to open from the counterbore 84 and communicate at their outer ends with the respective outer extremities of the vane slots 88 is a series of liquid passages 145. Adjacent these passages are a pair of annular grooves 146 and 147 are formed in the counterbore 84. Pipes 148 and 149 are screwed into suitable tapped holes provided in the case 61 and are connected with grooves 146 and 147 respectively by passages 150 and 151. Pipes 148 and 149 are illustrated in FIG. 5 diagrammatically as connected respectively to reservoir R and to the discharge side of pump P. Pipe 149 also connects to control pressure valve V which bypasses liquid to reservoir R when the pressure for which this valve is set is exceeded in pipe 149, pump P continually drawing on reservoir R for its supply of liquid.

Assembly plate 74 operates in transmission 60 also as a rotary valve and has formed in the cylindrical peripheral surface thereof four circumferentially elongated recesses 155 which are located in the plane of the passages 145 and are of such length and such disposition as will be made clear hereinafter. Formed in assembly plate 74 and each communicating with one of the recesses 155 and with the annular groove 147 is a series of liquid passages 156.

Also formed in the outer periphery of the valve plate 74 is an annular channel 157 which is in constant communication with the annular groove 146 and detours around the recesses 155 as shown in FIG. 5 so as not to communicate with these recesses yet communicates with the passages 145 whenever these are not in communication with one of the recesses 155.

As may readily be seen by reference to FIG. 1 in which one of the elements 80 is shown in section in a radial plane, the only zones in the periphery of the motor rotor 81 with which the motor vanes 89 make a tight sealing engagement are the zones 158 and zones 159. There is one of these zones on each of the elements 80, the zones 158 being located relatively close to the axis of the transmission and the zones 159 being located relatively distant from said axis. As shown in FIG. 5, one of the recesses 155 is located in slightly overlapping relation circumferentially with each of the zones 158 and other recesses 155 are located in a similar overlapping relation with the respective zones 159. The reason for this relationship between the recesses 155 and sealing zones 158 and 159 will be made clear hereinafter.

Operation

As pointed out briefly heretofore, the range of drive ratios between the drive shaft 125 and the driven shaft 65 which is offered by the transmission 60 is illustrated operationally in FIGS. 1, 4, 6 and 7. At one end of this range we have a reverse drive ratio shown in FIG. 1 in which clockwise rotation of the rotor 126 results in a counterclockwise rotation of the motor rotor 81. This results from a crosswise elongation of the pump rotor chamber 120 so that radial passages 110 in the motor rotor which normally serve as discharge passages become suction passages through which liquid is sucked into the pump rotor chamber 120 whereas passages 103 which are normally intake passages become discharge passages and conduct liquid out of the pump rotor chamber 120. This reversal of the direction of flow of liquid as it circulates between the pump rotor chamber and the motor rotor chamber naturally results in reversing the direction of rotation of the motor rotor.

Manipulation of the elements 80 of the motor rotor 81 of the transmission 60 to change from one drive ratio to another within the range in which the transmission 60 is operative, is accomplished by manually shifting the outer race of the ball bearing collar 70 axially on the hollow shaft 65. A suitable mechanism may be provided for applying this manual control to the collar 70. Such a mechanism is not shown as this is well within the skill of the art and constitutes no part of the present invention.

As the position of the control collar 70 in FIG. 5 corresponds to the relative position of the elements 80 shown in FIG. 1, the initial movement rightward of said control collar shifts elements 80 apart. When this movement has produced a relation between elements 80 as shown in FIG. 4 the transmission is in idling position. In other words the pump chamber 120 is now substantially circular in outline so that no liquid is circulated by the rotation of rotor 126. In view of the fact that the peripheral surface of the motor rotor 81 has a considerably elongated ellipsoidal outline, and the fact that vanes 89 make a liquid tight seal with the zones 158 and 159 of said periphery, a circulation of liquid is necessary for the rotor to rotate, and, there being none, the rotor 80 is locked in stationary position notwithstanding the fact that the pump rotor 126 is rotating.

Upon the ball bearing collar 70 being now moved still further rightward along the hollow driven shaft 65 from the position which produced the condition of the motor rotor shown in FIG. 4, the pump rotor chamber 120 becomes elongated in a direction parallel with the direction in which elements 80 are slidably related and the result of such an elongation of the pump rotor chamber 120 is illustrated in FIG. 6. Here it will be noted that as the pump rotor chamber 120 is elongated in said direction the ellipsoidal elongation of the outline of the periphery of the motor rotor 81 has been simultaneously reduced. FIG. 6 thus illustrates one of an infinite number of variations in the adjusted relationship between the elements 80 of which the transmission 60 is capable so that, by progressively passing through these various relationships in the actuation of the bearing collar 70, the drive ratio between the drive shaft 125 and driven shaft 65 of the transmission 60 is progressively changed from infinity to zero (after shifting out of reverse and into the position shown in FIG. 4) to a drive ratio of one to one as illustrated in FIG. 7.

It may be readily observed, that as the drive ratio effected by the transmission 60 is progressively modified to approach a one-to-one drive ratio, the lugs 112 extend with a close sliding fit between the shoulders 111a forming the throats of liquid passages 110 so as to somewhat restrict the cross-sectional area of the latter passages. This does not seriously impede the flow of liquid through these passages until the one-to-one drive ratio is closely approached whereupon the collar 70 is moved to its extreme rightward limit to invest the transmission 60 with a one-to-one drive ratio as illustrated in FIG. 7 which clamps the valve noses 112a of the lugs 112 against the horizontal edges of the shoulders 111a thereby completely closing passages 110 and locking the motor rotor 81 to the pump rotor 126.

With the passages 110 thus closed, there is no longer any need for motor vanes 89 to make a sealing connection with the peripheral motor rotor zones 158 and 159. The contour of the periphery of the motor rotor is now circular and the friction in the operation of the transmission can be materially reduced by allowing said vanes to ride relatively freely over the circular periphery of the motor rotor. A way for accomplishing this will be described after describing the means for selectively pressurizing the motor vanes inwardly disclosed in FIG. 5.

Here we see a means provided for supplying operating liquid under pressure through pipe 149 to annular groove 147. The pressure which oil is under in groove 146 is relatively light. The pressure under which liquid is supplied to groove 147 is relatively high. No specific figures are given for these pressures because the optimum in each instance may be readily determined by trial and error. The purpose of this hydraulic system is to apply fluid pressure centripetally, that is to say radially inwardly against each of the vanes 89 only when this vane is disposed opposite one of the imperforate zones 158 and 159 on the periphery of the motor rotor 81. This is effected by supplying liquid under relatively high pressure through each of the passages 145 to its respective vane 89 when that passage is in communication with one of the recesses 155. Thus each vane 89 is pressed against each of the zones 158 and 159 while it is opposite one of these but, as soon as the recess 155 causing this inward pressure against this vane travels out of position from beneath the passage 145 leading to that vane, that passage comes in communication with the annular channel 157 which communicates with the low pressure groove 146 thereby relaxing the liquid pressure imposed against that vane 89 until another one of these zones 158 or 159 turns into position opposite that vane.

The pipe 148 acts as an overflow pipe conducting liquid escaping from the high pressure liquid system into the groove 146 and back to the reservoir R.

While the pump P is shown diagrammatically as a separate entity from the transmission 60 it may readily be embodied therewith and driven directly from drive shaft 125 and can be mounted directly on that shaft. Provision also would be made in such an instance to provide a cut-off valve which would shut off the flow of liquid under high pressure to the motor vanes 89 upon the transmission 60 becoming adjusted to operate at a one-to-one drive ratio.

A concrete means to accomplish this function is illustrated in the modified form of hydraulic vane actuating mechanism shown in FIG. 8. In this arrangement, the assembly plate valve 74 has recesses 155 and channel 157 exactly as shown in FIG. 5 excepting that no passages 156 are provided in the assembly plate valve 74. Instead, each recess 155 is supplied with liquid under pressure through a right angle duct 165 which opens through the surface 84a into the operating chamber of the transmission to receive oil under pressure from one of the passages 110. FIG. 8 shows a notch 166 in one of the element walls 111 through which liquid normally flows to the adjacent port 165 but which has just been shifted upwardly out of registry with port 165 upon the transmission having been adjusted to effect a one-to-one drive ratio thereby cutting off the supply of operating liquid under pressure to the recesses 155. Thus with the hydraulic system shown in FIG. 8, the application of pressure hydraulically to the outer ends of vanes 89 to force these radially inwardly terminates upon a one-to-one drive ratio being assumed by transmission 60 so that throughout the continuance of that drive ratio, vanes 89 will be pressed inwardly against the motor-rotor 81 only by the very light pressure of springs 90. The friction occasioned by such contact is thus reduced to a point where it represents very slight drain upon the overall efficiency of the transmission. The hydraulic arrangement shown in FIG. 8 is completely self-contained within the transmission 60 and the annular channel 157 constantly connects all the passages 145 not communicating with one or the other of the recesses 155.

I claim:

1. In a hydraulic positive displacement power transmission, the combination of: a housing providing a liquid tight cylindrical motor chamber having flat parallel end faces; an endless series of motor vanes mounted on said housing and yieldably extending inwardly therefrom into said motor chamber; a motor rotor rotatably mounted within said chamber and concentric therewith, the periphery of said motor rotor having an ellipsoidal peripheral surface with certain zones of which said motor vanes make a fluid sliding engagement as said motor rotor rotates, an ellipsoidal vane pump chamber being provided within said motor rotor, said peripheral surface and said pump chamber being each symmetrically balanced about the rotational axis of said motor rotor; and a radial vane pump rotor functioning as an impeller and rotatably mounted within said pump chamber coaxially with but independent of said motor rotor, said motor vanes, said motor rotor and said pump rotor making a fluid tight sliding fit with said motor chamber end faces, there being liquid circulating passages in said motor rotor for conducting operating liquid from said motor chamber to said pump chamber and vice versa to hydraulically transmit rotary motion from said pump impeller to said motor rotor; and speed control means for conversely modifying the outlines of said pump chamber and the periphery of said motor rotor to modify the drive ratio between said pump impeller and said motor rotor within a given forward drive range, and, at the low end of said range, to provide a reverse drive of said motor rotor by said pump impeller.

2. A combination as recited in claim 1 wherein the forward drive range mentioned is between a direct drive ratio of one to one and an idling relationship of infinity to zero, the peripheral outline of said motor rotor being circular and the outline of said pump chamber having a maximum ellipsoidal elongation in a given direction at the top of said range (direct drive ratio), and the pump chamber outline being approximately circular and the peripheral outline of said motor rotor being ellipsoidally elongated at the bottom end of said forward drive range (idling point), and wherein said reverse drive is accomplished by further modifying the outline of said pump chamber past said idling point to where its contour is ellipsoidally elongated in a direction normal to the aforesaid direction whereby the direction of circulation of operating liquid between said chambers is reversed, thus reversely rotating said motor rotor.

3. A combination as recited in claim 2 wherein said motor rotor comprises a pair of J-shaped elements placed concave-face-to-concave-face to produce said internal pump rotor chamber, with said elements in mutually sliding relation and having an external configuration whereby they unite to form a circular periphery when in maximum extended relation with each other, and to form an ellipsoidal periphery when shifted towards each other from said maximum expanded relation; and control means for maintaining said elements in symmetrically balanced relation at all times relative to the axis of said cylindrical housing chamber.

4. A combination as recited in claim 3 wherein said pump chamber is formed by concave surfaces of said elements which are brought face to face in said motor rotor and portions of adjacent flat surfaces of said elements, said concave surfaces comprising sectors of a cylinder which are slightly less than a semi-cylinder whereby said concave surfaces, at the point of maximum inward adjustment of said elements towards each other, produce a pump chamber which is ellipsoidally elongated in a direction normal to the direction which said elements are slidable relative to each other.

5. In combination: a body having a cylindrical chamber with flat radial end walls; a cylindrical drive rotor rotatably mounted within said chamber and coaxially therewith; a series of equally spaced radially slidable pump vanes provided on said rotor; a driven rotor surrounding said drive rotor and rotatably mounted in said chamber coaxially therewith, said driven rotor providing a pump chamber in which said drive rotor is confined, said pump chamber having an ellipsoidal configuration disposed symmetrically relative to said axis, said driven rotor also having an ellipsoidal peripheral configuration; a series of equally spaced radial vanes mounted slidably in said body to be yieldably extended inwardly into contact with the peripheral surface of said driven rotor, there being passages provided in said driven rotor for conducting liquid from the portion of said cylindrical chamber located outside said driven rotor into said pump chamber and from said pump chamber back to said cylindrical chamber portion whereby liquid is drawn into said pump chamber by rotation of said pump rotor and discharged from said pump chamber into the portion of said cylindrical chamber exterior of said driven rotor so as to cause a rotation of said driven rotor within said cylindrical chamber in the same direction but at a different rate than the rate of rotation and said pump rotor, certain diametrically opposite zones of said peripheral surface of said driven rotor being imperforate so as to form a sealing engagement with said outer vanes when engaged by the latter; and means for selectively applying centripetal forces against each of said outer vanes only during the periods when one of said zones is disposed opposite said vane.

6. A combination as in claim 5 in which the means last recited utilizes liquid under pressure for applying said centripetal forces; and a rotary valve embodied with said driven rotor for selectively directing operating liquid to each of said outer vanes for the purposes aforestated.

7. A combination as in claim 6 wherein operating liquid is supplied under pressure to said rotary valve from said cylindrical chamber.

8. A combination as in claim 6 in which operating liquid under pressure is supplied to said valve from a source external to said cylindrical chamber.

9. In combination: a pump rotor provided with a series of equally spaced radially slidable vanes; a pump stator providing an ellipsoidal operating chamber for said rotor and vanes, said chamber being balanced symmetrically with the axis of said rotor; means for varying the volumetric content and length of said chamber to vary the performance of said rotor therein, said rotor functioning as a pump rotor and said stator operating both as a pump stator and as a motor rotor having an ellipsoidal periphery which varies in length conversely with the variation aforesaid in the length of said pump chamber; a motor housing providing a circular motor chamber enclosing said motor rotor and providing a circular series of motor vanes radially slidable and yieldably urged inwardly into engagement with said motor rotor, there being liquid circulating passages in said motor rotor connecting said motor chamber to said pump chamber for causing rotation of said motor rotor by liquid delivered from said pump chamber into said motor chamber, operation of said means for varying the volumetric content of said pump rotor chamber culminating at one extreme of the range of such variation in the periphery of said motor rotor becoming substantially circular in outline; and means responsive to said periphery becoming circular to close certain of said circulating passages to hydraulically lock said pump rotor against rotation within said motor rotor, thereby giving a one-to-one drive ratio between said pump rotor and said motor rotor.

10. A combination as in claim 9 in which means is provided for applying force centripetally against each of said motor vanes only when said vane is opposite an imperforate zone of said motor rotor periphery.

11. A combination as in claim 10 wherein said last recited means is rendered inoperative to apply such forces to said vanes when said transmission is in one-to-one drive ratio.

12. A combination as in claim 9 in which means is provided for yieldably applying pressure inwardly radially onto said motor vanes to cause a good sealing relation between said vanes and imperforate zones of said peripheral surface of said motor rotor; and means for very materially reducing said inward pressure on said motor vanes when said transmission is in one-to-one drive ratio.

No references cited.